(12) United States Patent
Hall (10) Patent No.: US 6,378,037 B1
(45) Date of Patent: Apr. 23, 2002

(54) WRITE-TWICE METHOD OF FAIL-SAFE WRITE CACHING (75) Inventor: David Robison Hall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/342,107

(22) Filed: Jun. 29, 1999

(51) Int. Cl.[7] .......................... G06F 12/08; G06F 13/00
(52) U.S. Cl. .............................. 711/113; 71/112; 71/154
(58) Field of Search ................................ 711/100, 111, 711/112, 113, 114, 154, 118; 714/118, 119

(56) References Cited

U.S. PATENT DOCUMENTS

| 5,283,884 A | * | 2/1994 | Menon et al. | 711/100 |
|---|---|---|---|---|
| 5,327,570 A | * | 7/1994 | Foster et al. | 712/1 |
| 5,493,668 A | * | 2/1996 | Elko et al. | 711/130 |
| 5,535,372 A | * | 7/1996 | Benhase et al. | 714/100 |
| 5,636,355 A | * | 6/1997 | Ramakrishman et al. | 711/113 |
| 5,748,874 A | | 5/1998 | Hicksted | |
| 5,806,085 A | | 9/1998 | Berliner | |
| 5,884,093 A | | 3/1999 | Berenguel et al. | |
| 5,912,906 A | * | 6/1999 | Wu et al. | 371/40.11 |

* cited by examiner

Primary Examiner—Tuan V. Thai
(74) Attorney, Agent, or Firm—Christopher H. Lynt; Matthew J. Bussan (57) ABSTRACT Fail-safe write caching uses specially arranged portions of a disk surface to store write cache data during drive idle time. In case of a system or drive failure before the data is written to its ultimate disk destination, the data can be read from the specially arranged portions to effect recovery without data loss.

18 Claims, 8 Drawing Sheets

Layout of WTCB's around a single cylinder

W - Write-twice cache block
B - Standard block of data
$S_n$ - Sid number n

Notes: •90 SIDS/Track
•Five platters
•Each WTCB block spans two standard blocks of data
•Each cylinder contains 20 WTCB's + 4480 SBD

Layout of WTCB's on a single track for head 0.

W – Write-twice cache block
B – Standard block of data
$S_n$ – Sid number n

Notes:
- 90 SIDS/track
- Five platters
- Each WTCB block spans two standard blocks of data.
- This track contains two WTCB's and 448 standard blocks of data

WRITE-TWICE METHOD OF FAIL-SAFE WRITE CACHING

BACKGROUND OF THE INVENTION

1. Field of The Invention

The invention relates to the field of non-volatile storage device operation, and in particular, to the temporary storage of the contents of a direct access storage device (DASD) write command prior to the contents being written to their intended destination location on a disk surface, commonly referred to in the art as write caching.

2. Background Information

In data processing systems, processors and electronic memory devices generally operate at relatively high speeds. Volatile electronic memory devices can be written to and read from rapidly. However, when system power is removed, intentionally or accidentally, the contents of volatile memory, by definition, are not retained. Many data processing applications require long-term data storage and/or a high-degree of data integrity, and these needs are met by non-volatile data storage devices. Non-volatile storage can be provided by a variety of devices, most commonly, by direct access storage devices (DASD's), often also referred to as hard disk drives.

However, many non-volatile memory devices, such as DASD's and tape drives, for example, are inherently slower than data processors and volatile memory devices by virtue of their being mechanical devices having moving parts. A DASD generally has one or more magnetically readable and writable disks, which rotate, each disk having one or more electromagnetic transducers (heads) per readable/writable surface which can be positioned over a desired location to read and/or write data on a respective disk surface. A transducer (head) receives an electrical signal and produces a magnetic field to write data to a disk surface. Conversely, to read written data from a disk surface, a head is passed over magnetized areas on the disk surface and a magnetic field is thereby induced in the head producing an electrical signal output.

Hard disks are generally metal or glass platters coated with a magnetic oxide that can be magnetized to represent data. Floppy disks, by contrast, are generally made of a flexible plastic (e.g., Mylar) material, disposed in a protective hardened plastic jacket. A hard disk drive (DASD) generally has several disks, also called platters, assembled together in a disk pack. All of the platters rotate together on a common spindle. A series of access arms carrying read/write heads, one for each disk surface top and bottom, provide access to concentric tracks on the platters. The access arms generally move together and are sometimes referred to as a comb structure since they resemble the teeth of a comb.

A disk surface is typically formatted into a number of concentric tracks. The tracks may be subdivided into sectors, which are subdivided into blocks for storing user data and the like. The formatting enables a particular location on the disk surface to be reliably accessed by providing markers for accurately positioning a read and/or write head. A set of corresponding tracks on a set of disk platters is referred to as a cylinder. A set of contiguous tracks/cylinders on a platter/platters is referred to as a partition (see FIGS. 1B and 1C).

Of course, due to the physical properties of the DASD, data cannot be instantaneously written to a particular location on the rotating disk surface. A head cannot instantaneously move to the correct disk surface location to perform a write operation when desired, for example. Individual bits of data are written to respective individual locations in a serial fashion as the disk surface rotates under the head. Thus, when a data processing system writes data to a DASD, the writing process is naturally slower than when writing to an electronic device, such as volatile memory.

In a data processing system write to DASD operation, for fault tolerance and recovery reasons, before moving on to other tasks, the data processing system should wait for confirmation that the data has been written to the DASD. However, the inherently slower operation of the DASD could cause the data processor to be idle for significant periods of time waiting for the DASD to complete the write operation unless measures are taken to avoid this.

Write caching is one method used to avoid slowing down a data processing system when a write to non-volatile storage, for example, to a DASD, is performed. This is generally accomplished by temporarily placing the contents of the write command (data) into a volatile cache memory associated with the DASD before writing them to the DASD surface. Once they are written to the cache memory, an inherently faster process than writing to the DASD, a write confirmation message is sent back to the processor indicating that the contents were written so that the processor can continue with other activities. However, in fact, they were not really written to the surface of the DASD. The data is really only cached in volatile memory and will actually be written to the destination DASD surface some time later.

While such write caching has the effect of speeding up overall system operation under ordinary circumstances, there is the danger that should a power interruption, drive fault, or other error occur between the time the write confirmation message is sent to the processor and the time the data is actually written to the DASD surface, data will be lost. Measures are available to compensate for certain causes of such failures, such as uninterruptable power supplies (UPS's) to prevent a power source interruption from shutting down the data processing system before data writing can be completed.

For example, U.S. Pat. No. 5,748,874 to Hicksted et al. (May 5, 1998) titled "RESERVED CYLINDER FOR SCSI DEVICE WRITE BACK CACHE" describes a disk drive in a computer system equipped with a power storage unit that supplies power to the drive controller when there is a system power interruption, such as a power-down or a power failure. Once the controller is notified that system power has been interrupted, it immediately initiates a seek to a reserved location in the disk drive and stores the contents of the cache memory at the reserved location. After power has been restored to the system, the controller loads the contents of the reserved cylinders back to the cache memory and completes the pending write operations by writing all of the data items in the cache to their respective final locations in the drive.

Hardware manufacturers have generally addressed the problem of potential write cache data loss in one of three ways: just ignore the problem, due to the large performance gains seen with write caching, and accept a higher risk of data loss; use additional hardware to provide a non-volatile write cache (including uninterruptable power supply arrangements); or simply disable the write caching feature altogether where a data loss would be catastrophic.

The additional hardware solution may take the form of an uninterruptable power supply or the like, such as in the Hicksted et al. patent referenced above, or some other type of non-volatile memory, such as flash memory, for example. However, even these types of additional hardware measures do not solve the problem of a hard drive dead lock, where the drive must be reinitialized. Dead lock occurs when the hard drive is unable to process commands and/or communicate with the initiator. This is a state that is never supposed to occur, but it can happen. This may be the fault of the drive or the initiator. Usually, the only solution to this deadlock is to restart the drive and possibly the entire system by an internal reset or by power-cycling the equipment. In either case, if data meant to be written to the disk is contained in the drive cache when this occurs, data will be lost. This would not be a problem if the initiator were aware that the data has not been written, but in the case of a standard write cache, this is not the case. With the invention, the initiator is not notified that the data has been written until it has actually been written somewhere, i.e., to WTCB's. Although the data may not have been written to its final destination, it is present on the physical media when the drive is restarted, so that a recovery procedure can locate the data and write it to the correct location. By contrast, in the case of a standard write cache, the data was in volatile memory and was, therefore, lost when the drive was shut down due to the dead lock.

Therefore, a need exists for a way to minimize idle processor time during a write to non-volatile storage, as is accomplished by write caching to volatile memory, but minimize the risk of data loss and minimize the need for additional hardware at the same time.

As mentioned earlier, a disk surface area is generally divided into portions during a process called formatting in which boundary data is written to the disk surface so that a precise position of a disk head can be confirmed for reading and writing. Typically, each disk surface, top and bottom, is divided and sub-divided into concentric tracks, sectors within the tracks, and blocks of data within the sectors, for example. A collection of corresponding disk tracks on the disk platters in a drive is referred to as a cylinder. A DASD generally has a plurality of cylinders, disks, and disk surfaces, and therefore, has a plurality of disk heads. On such multi-surface, multi-disk, multi-cylinder DASD's, the heads may be arranged on arms of a mechanism referred to as a comb structure.

Figure 1A:
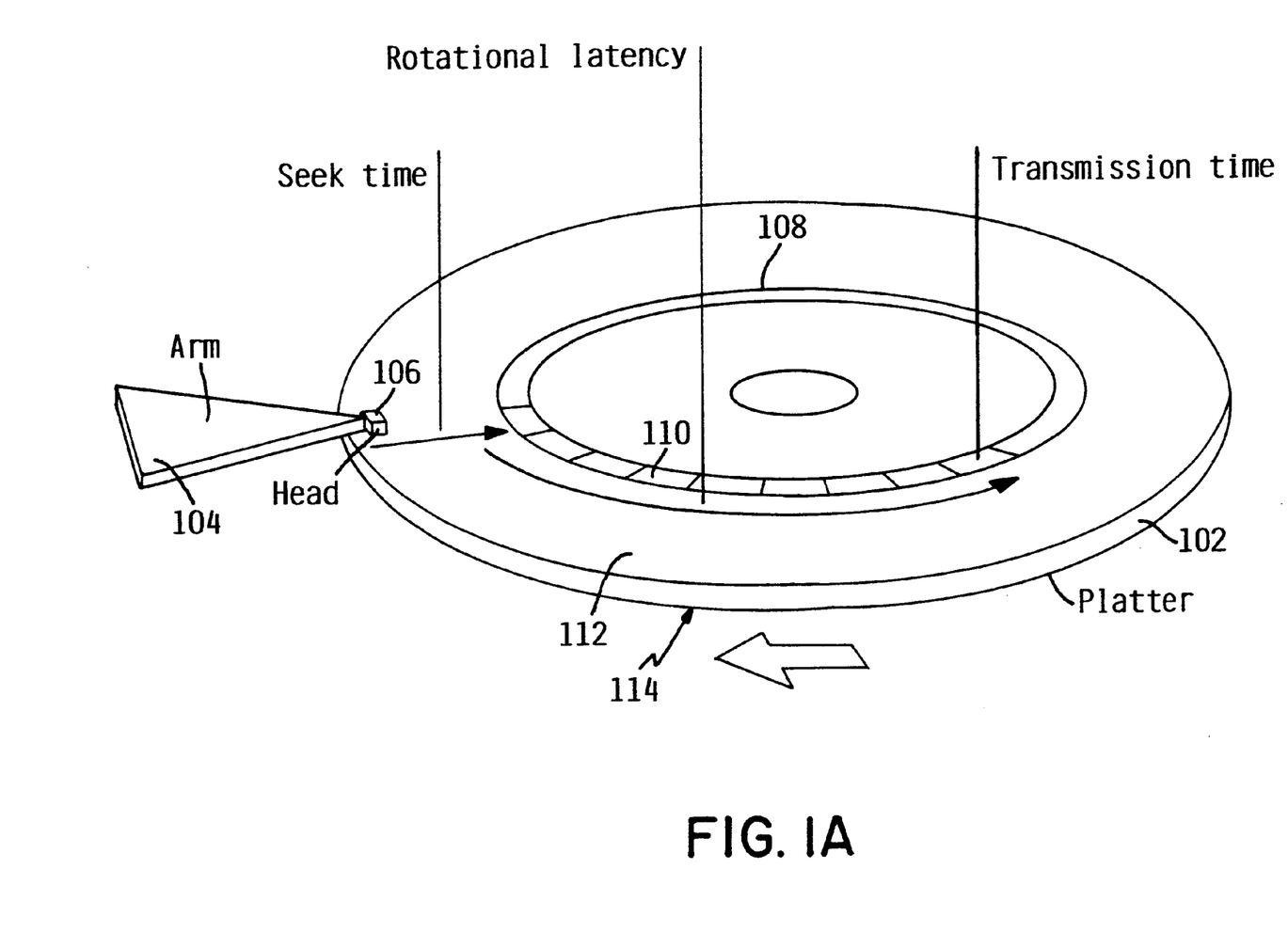
FIGS. 1A, 1B and 1C illustrate aspects of a typical hard disk drive apparatus.

The time required for the arms of the head mechanism to arrive over the correct cylinder after being commanded to that cylinder location is called "seek time" or simply "seek," and the time required for the head to reach the correct location on a track, by virtue of the disk rotation, is called "rotational latency time" or simply "latency." The time to read the block or blocks of data as they pass under the head is called the "transmission time" or "block transfer time." These times are illustrated in FIG. 1A. These times are generally on the order of milliseconds, but clearly seek and latency are variable because they are dependent on where the block to be read or written is located relative to where the head is located when the command is given.

Latency and seek may be collectively referred to as "idle time" since reading and writing to the desired surface location is not done during this time and the DASD is, in this respect, idle. Generally, only one surface is read from or written to at a time, and therefore, only one head is active at a given time. To read from a different surface, a switching from one head to another is performed. Although this is a relatively rapid process, there is still some disk rotation that occurs during this switching. Therefore, if one were to write a block to a first disk surface and then switch to a second surface to write a next block of data, there would be a rotational offset between the two blocks equal to the distance the disks travel (rotationally) during the time required to switch between heads.

It is known to use hard disk drives as a cache storage for even slower devices, such as CD-ROM (compact disk read only memory) devices. For example, U.S. Pat. No. 5,884,093 to Berenguel et al. (Mar. 16, 1999) entitled "HARD DISK CACHE FOR CD-ROM AND OTHER SLOW ACCESS TIME DEVICES" describes a controller system for a CD-ROM drive or other slow access device such as a magneto-optical device using a conventional hard disk drive as a cache memory. The hard disk cache is partitioned to use a portion thereof to clone the most often used data blocks on the CD-ROM disk such as the directory/file allocation table, while the balance of the hard disk is used to cache some or all of the balance of the CD-ROM disk using conventional cache memory least recently used rules. Three bus controllers for the host computer, CD-ROM drive and the hard disk cache are controlled by a microprocessor which runs a control program that implements the cloning and cache rules. The three bus controllers are connected by a DMA bus for faster transfer of data. The microprocessor controls the directions of the DMA transfers by data written to a control register.

Similarly, U.S. Pat. No. 5,806,085 to Berliner (Sep. 8, 1998) entitled "METHOD FOR NON-VOLATILE CACHING OF NETWORK AND CD-ROM FILE ACCESSES USING A CACHE DIRECTORY, POINTERS, FILE NAME CONVERSION, A LOCAL HARD DISK, AND SEPARATE SMALL DATABASE" describes a non-volatile caching system and a method for implementing the system, applied to rotating magnetic media, such as hard disk drives. The system retains data even in the event of system shutdown and re-boot, caching data from large, randomly accessed files, such as databases, in a space-efficient manner on the magnetic media. A conversion routine converts CD-ROM file names or network file names to local hard disk drive file names and back. A mini-database is created for each cached file on the hard disk drive. The mini-data base maps randomly-accessed blocks of data within the cached file on the local hard disk drive.

From the above, it is apparent that there is a need for a write caching system for DASD's and the like, which avoids the problem of potential data loss while at the same time minimizing any adverse impact on system time utilization efficiency, complexity and cost.

SUMMARY OF THE INVENTION

It is, therefore, a principal object of this invention to provide for fail-safe write caching.

It is another object of the invention to solve the above-mentioned problems so that write caching can be accomplished with reduced risk of data loss should an equipment or other failure occur, while at the same time minimizing any impact on cost, complexity and efficiency.

These and other objects of the present invention are accomplished by the method and apparatus disclosed herein.

According to one aspect of the invention, fail-safe write caching is provided for a direct access storage device (DASD) without the need for any additional hardware by utilizing specially arranged portions of the disks to write the cached data during DASD idle time before finally writing the data to its intended ultimate disk location. Advantageously, a DASD made according to this aspect of the invention has a competitive advantage over DASD's which do not provide a fail-safe write cache and incur the risk of losing cached data, those which provide fail-safe write caching through the use of additional hardware and thereby incur greater manufacturing cost, or those which do not implement any write caching at all and incur a lower performance level. These specially arranged portions of the disks have been given the name write-twice cache blocks (WTCB's) by the inventor.

According to another aspect of the invention, a 'virtual' write cache is created by virtue of the WTCB's. Once a block from the write cache memory has been written to a WTCB, that data can be removed from the write cache memory, and thereafter, the WTCB acts as the write cache for that data. Later, the data is read from the WTCB and written to the final destination. The net effect of the WTCB acting as a write cache is that more write commands can be cached than could otherwise be stored in the volatile write cache memory. Thus, the effect is the creation of a virtual cache.

According to another aspect of the invention, a fail-safe recovery method is provided in case a power interruption or a drive fault occurs, for example.

According to another aspect of the invention, a new type of data block is provided, as well as a strategy for placing the new data block and using it.

Advantageously, a system according to the invention solves the data integrity problem inherent in write caching. The data integrity problem occurs when a drive has indicated that a particular block was written to the media platter, but it has not really been written. In such a case, there is a period of time between when the drive has received the data and when the data is written, that the drive media is not really in the state that the initiator (the one that sent the data) believes it is. If, for some reason, the drive cannot write the data to the correct location, due to a power failure, drive fault, etc., then the drive will stay in this inconsistent state. This can lead to crashes/faults/etc. in the main system. The invention solves this problem by writing the data to a temporary location before indicating to the initiator that the data has been written. Then, if a failure does occur, during recovery, the data that was written to the temporary storage location on the disk media can be read and written to the correct location.

Advantageously, a system according to the invention does not require any additional hardware to be implemented.

Further, advantageously, a system utilizing write-twice cache blocks (WTCB's) according to the invention comes with only limited possible performance drawbacks. One possible performance drawback is a drop in sequential read or write performance. Since the WTCB's reduce the number of standard sectors on a track, the number of sectors read on each revolution is reduced. However, in an exemplary embodiment, the reduction is slight, on the order of 1% to 2% fewer sectors read per revolution.

Another possible performance drawback is an increase in bus overhead, because with an arrangement according to the invention in contrast with the prior systems, the disk drive write cache memory will not send back a command complete response immediately after receiving a write command from an initiator. Instead, a separate communication connection is made between the disk drive and the command initiator after the data has actually been written to a WTCB. Because establishing the connection takes some small but finite amount of time, overhead on the bus is increased. However, these small performance costs pale by comparison with the performance cost a loss of data could cause, which is minimized according to the invention.

According to another aspect of the invention, two properties of hard drives are taken advantage of: hard drives are a non-volatile storage medium; and the main performance bottleneck of hard drives is drive latency.

According to an aspect of the invention, the time between when the head mechanism has arrived over the correct cylinder (seek) and when the correct location on the track is reached (latency) is used to write portions of the write cache to the disk. In particular, the portions of the write cache are written to special blocks, referred to as Write-Twice Cache Blocks (WTCB) herein. Each WTCB holds: one block of data from the write cache, the data destination address, a time stamp which uniquely identifies the block of data as the latest entry, and a list of which WTCB's contain write cache information which has not yet been written to the respective ultimate destination.

According to another aspect of the invention, the WTCB's are located on each cylinder such that they are spaced evenly apart.

For example, a first WTCB is placed on a topmost track, i.e., a track of the topmost disk surface in the cylinder. Each successive WTCB is located on a next lower disk surface track, until a lowermost disk surface track is reached. The process continues from the first track until all WTCB's have been positioned.

According to another aspect of the invention, on a cylinder basis, the minimum distance between the end of a WTCB and the start of the next one must be greater than the time to do a control switch from one head to another. The reason for this will become clear from the method flow set forth in the detailed description.

The flow of an exemplary embodiment of the invention is as follows. When a write command is sent to the drive, the data will be requested from the initiator and placed in the write cache, assuming sufficient room exists. At this point, status for the command will NOT be sent back to the initiator, in contrast to how it is done in a standard write cache scheme. Instead, when a current operation, either a read or a write, finishes its seek, blocks of the write cache will be written to the WTCB's on that cylinder.

In order to write any of the WTCB's, sufficient latency must exist to allow a control switch from the currently selected head to the head with the shortest latency WTCB that does not already contain active data, time to write at least one WTCB block, and time to switch back to the original track. When the drive's scheduler issues a seek command, it has calculated the rotational distance measured in Servo ID samples (SID's) between the prior command and the one it is starting. Once the drive arrives at the destination cylinder, it continues to read the SID's until the desired starting sector is reached. Once the drive arrives at the destination cylinder, the remaining latency can be calculated by using the difference between elapsed time and the total rotational distance calculated earlier.

Alternatively, the current SID can be compared with the current command's SID location to determine the latency. The factors that determine the remaining latency include the prior command's SID and cylinder location as well as the current command's SID and cylinder location. If enough latency exists, multiple WTCB's may be written by switching heads in a round robin fashion.

An advantageous orientation of the WTCB's according to an aspect of the invention, is designed to minimize WTCB latency. By utilizing the latency from the operation, which would usually be spent idly, the write cache can be advantageously stored on the disk with no additional operating time.

When all of the blocks for a write command have been written to WTCB's (this may take several operations), status for the command will be returned to the initiator. At this point, should a power failure or drive fault occur, the necessary information to recover will be on the media.

According to an aspect of the invention, when the data for a write command is finally placed at its destination, its outstanding WTCB entries will be removed from the list.

According to an aspect of the invention, the recovery procedure is straight forward. When the drive is given the command to stop operation, it will flush the write cache and it will write a flag to its reserved data area, indicating that there are no outstanding write cache blocks.

According to an aspect of the invention, when the drive is restarted, it will check this flag and start recovery if necessary. In order to perform recovery, the drive will need to examine every WTCB on the media. Given the layout scheme provided, one cylinder's WTCB's could be examined per revolution. Therefore, recovery time would be dependent on the number of cylinders and the operating RPM.

According to an aspect of the invention, having the WTCB's spaced around the entire track is not a requirement. Instead, multiple cylinders could be used, requiring that short seeks (one or two cylinders) be performed to write some WTCB's. This would reduce the time required for recovery at the expense of reducing the average number of WTCB's that could be written. This can be worked out based on the performance and recovery requirements for a particular implementation. According to an aspect of the invention, once the latest WTCB is found, the list of outstanding WTCB's will be used to write the data contained in the list of outstanding WTCB's to the correct destinations, putting the drive into a consistent state.

These and other aspects, objects and advantages of the invention will become apparent from the detailed description of exemplary embodiments set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1B:
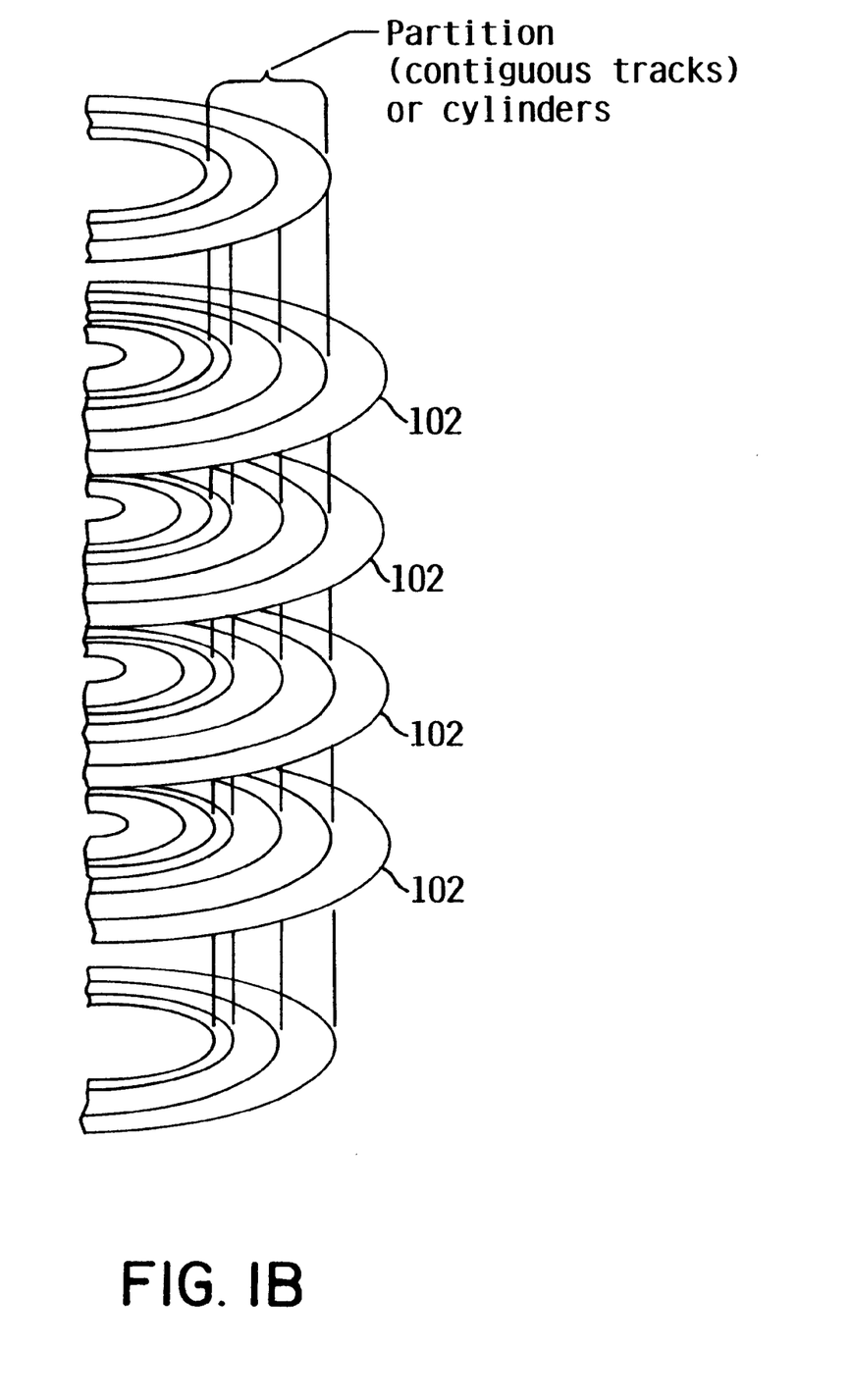
Figure 1C:
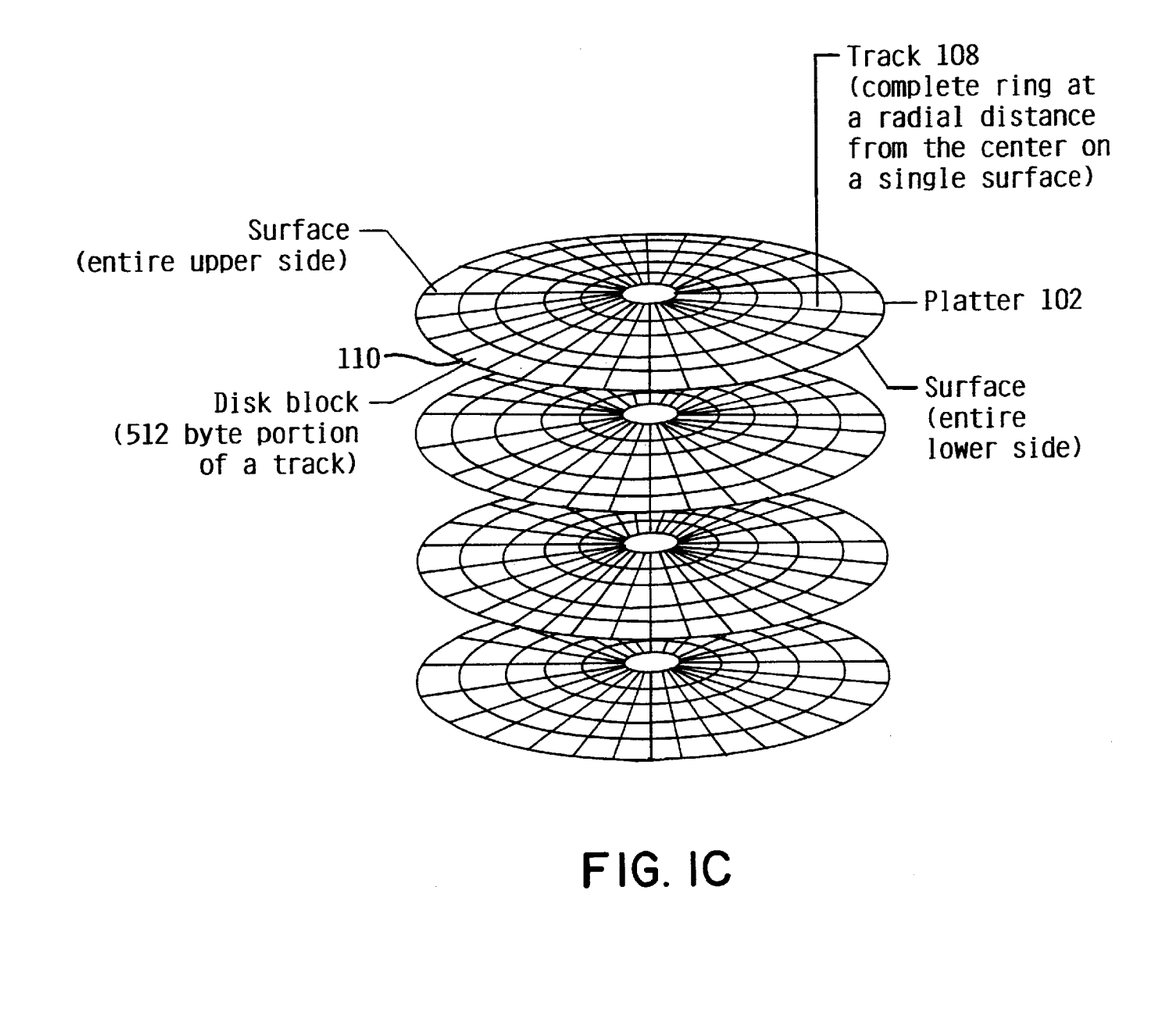

FIGS. 1A, 1B and 1C illustrate aspects of a typical hard disk drive apparatus as was described in the Background section above. A disk drive will generally have a plurality of rotating magnetic oxide coated metal or glass platters 102 that can be magnetized to represent data. Data is written to and read from each surface 112, 114 of the platters 102 by respective heads 106 positioned by the movement of respective arms 104 over particular areas of the surface. Each surface 112, 114 of the platter 102 is divided and organized into concentric tracks 108 having sectors containing blocks 110. From FIG. 1A the seek time, which is the time required to position the head 106 over a particular track 108, and latency (or rotational latency) which is the time after reaching the track 108 for the head 106 to be over a desired sector/block 110, can be seen. Transmission time is also illustrated, which is the time to read or write a block of data. A set of corresponding tracks on a set of disk platters is referred to as a cylinder. A set of contiguous tracks/cylinders on a latter/platters is referred to as a partition (see FIGS. 1B and 1C).

Figure 1D:
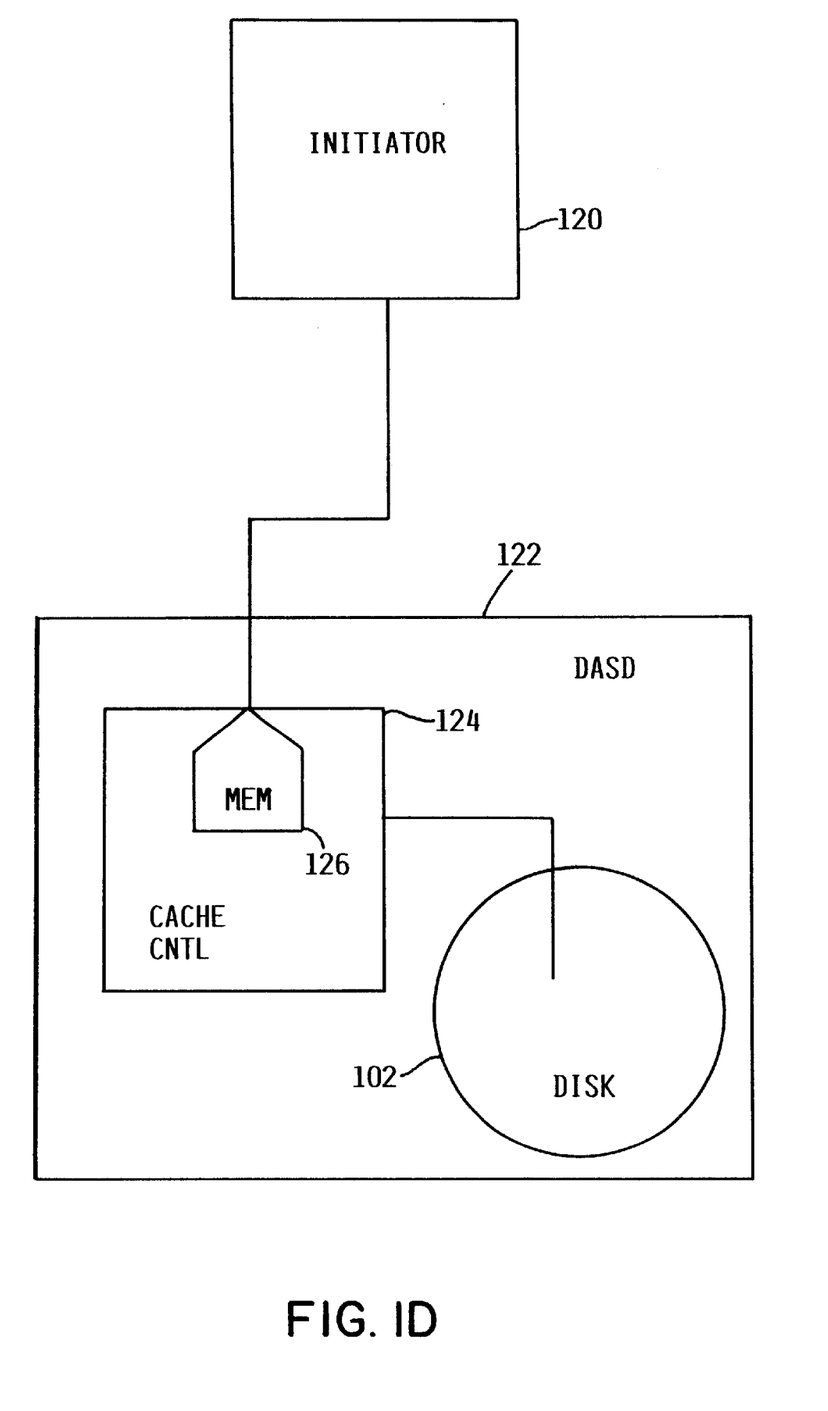
FIG. 1D is a block diagram of an initiator coupled to a DASD having cache memory and control for caching data to be stored on a disk.

FIG. 1D shows in block diagram form an initiator 120 coupled to a DASD 122 having cache memory 126 and control 124 for caching data to be stored on a disk 102. As already described, the initiator 120 sends write data to the DASD 122 which caches the data in cache memory 126 and returns a signal to the initiator 120. In the prior known write caching systems, the signal indicating a write has been completed is sent to the initiator 120 before the data has actually been written from cache memory 126 to the disk 102, under the control of controller 124. As described above, this risks data loss should any system or drive failure occur prior to the data actually being written to the disk surface. According to the invention, the disk 102 has specially arranged blocks to which the cached write data is written during DASD idle time, as will be described in detail below. According to the invention, after the cached write data has been written to these specially arranged blocks, the initiator 120 is then signaled that thw write has been completed.

Figure 2:
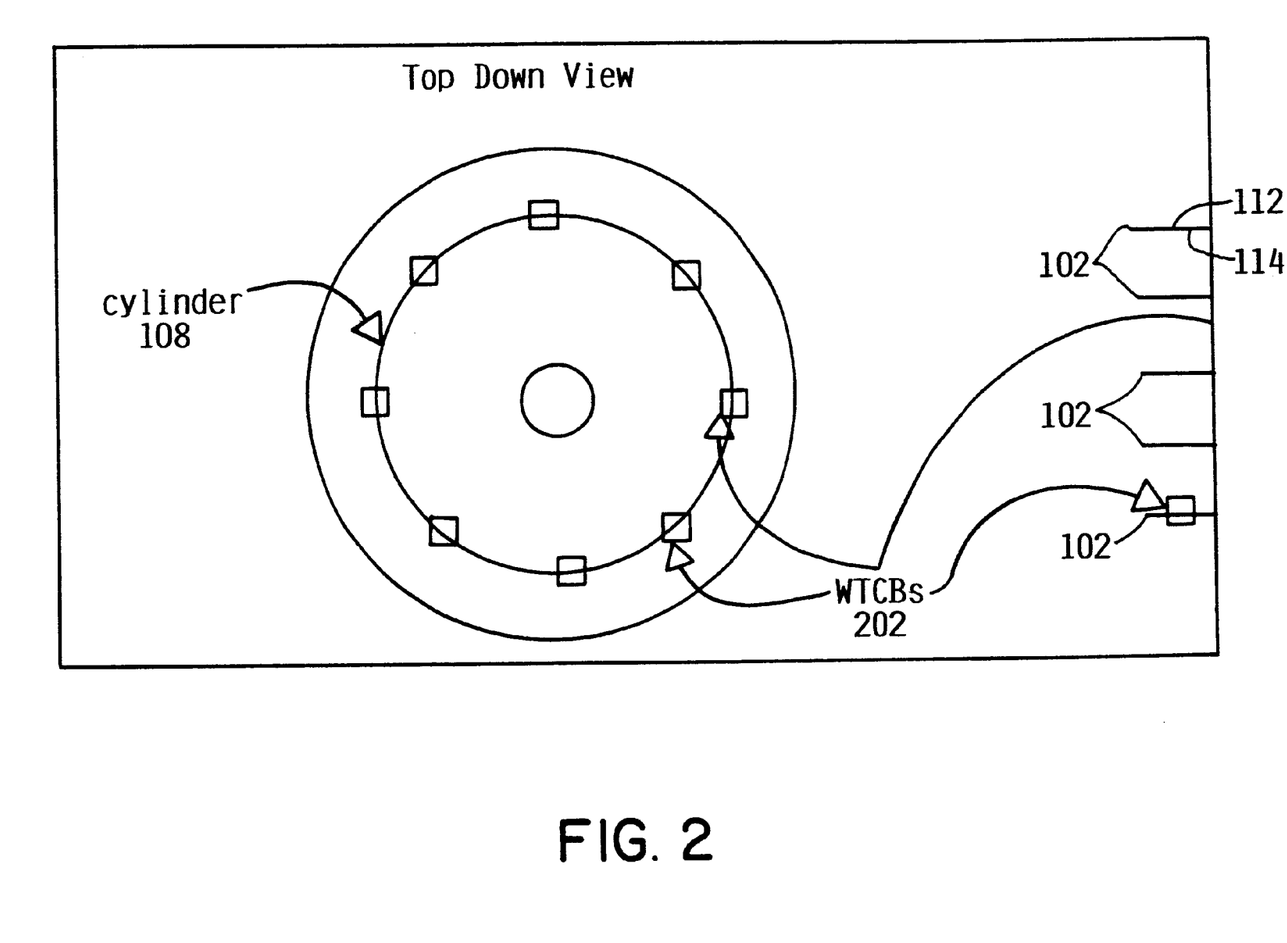
FIG. 2 illustrates a top down view of write twice cache blocks located according to an exemplary embodiment of the invention.

FIG. 2 illustrates a top down view of write twice cache blocks (WTCB's) located according to an exemplary embodiment of the invention. There are five platters 102 each having two surfaces 112, 114 which can be written to and read from. A number of concentric tracks/cylinders 108 are defined on the surfaces 112, 114 of each platter 102. A number of WTCB's 202 are disposed as illustrated.

According to the invention, the time between when the head mechanism has arrived over the correct cylinder (seek) and when the correct location on the track is reached (latency) is used to write portions of a write cache to the disk surface. In particular, the portions of the write cache are written to the Write-Twice Cache Blocks (WTCB).

Each WTCB holds, for example: one block of data from the write cache, the data destination address, a time stamp which uniquely identifies the block of data as the latest entry, and a list of which WTCB's contain write cache information which has not yet been written to the respective ultimate destination.

The time stamp used in the WTCB is not the system time clock, instead, it is based on the Power On Hours (POH) maintained by the drive. This time cannot be reset in normal customer operation. Multiple copies of this value are stored on the drive's media. Essentially, this time-stamping is a sequential numbering system. The time ordering is used exclusively to determine the most recent WTCB written in the case of a failure, as will be described below.

According to an exemplary embodiment of the invention, the WTCB's can be located on each cylinder such that they are spaced evenly apart. For example, a first WTCB is placed on a topmost track, i.e., a track of the topmost disk surface in the cylinder. Each successive WTCB is located on a next lower disk surface track, until a lowermost disk surface track is reached. The process continues from the first track until all WTCB's have been positioned.

Further, on a cylinder basis, the minimum distance between the end of a WTCB and the start of the next one must be greater than the time to do a control switch from one head to another, as will be explained in more detail below.

The flow of an exemplary embodiment of the invention is as follows. When a write command is sent to the drive, the data will be requested from the initiator and placed in the write cache memory, assuming sufficient room exists. At this point, status for the command will NOT be sent back to the initiator, in contrast to how it is done in a standard write cache scheme. Instead, when a current operation, either a read or a write, finishes its seek, blocks of the write cache will be written to the WTCB's on that cylinder, with the information mentioned above.

It should be noted that in order to write any of the WTCB's, sufficient latency must exist to allow a control switch from the currently selected head to the head with the shortest latency WTCB that does not already contain active data, time to write at least one WTCB block, and time to switch back to the original track. These times will be discussed in more detail below.

When the drive's scheduler issues a seek command, it has calculated the rotational distance measured in Servo ID samples (SID's) between the prior command and the one it is starting. Once the drive arrives at the destination cylinder, it continues to read the SID's until the desired starting sector is reached. Once the drive arrives at the destination cylinder, the remaining latency can be calculated by using the difference between elapsed time and the total rotational distance calculated earlier.

Alternatively, the current SID can be compared with the current command's SID location to determine the latency. The factors that determine the remaining latency include the prior command's SID and cylinder location as well as the current command's SID and cylinder location. If enough latency exists, multiple WTCB's may be written by switching heads in a round robin fashion.

When all of the blocks for a write command have been written to WTCB's (this may take several operations), status for the command will be returned to the initiator. At this point, should a power failure or drive fault occur, the necessary information to recover will be on the media.

Later, when time allows, the data written in the WTCB's will be written to its ultimate destination on the disk. When all the data for a write command is finally placed at its destination, its outstanding WTCB entries will be removed from the list of WTCB's which contain data not yet written to the ultimate destination.

Only the list in the most recent WTCB is used as the reference list, the lists in the other outstanding WTCB's are not updated.

A recovery procedure is straight forward. When the drive is given the command to stop operation, it will flush the write cache and it will write a flag to its reserved data area, indicating that there are no outstanding write cache blocks.

When the drive is restarted, it will check this flag and start recovery if necessary. In order to perform recovery, the drive will need to examine every WTCB on the media. Given the layout scheme provided, one cylinder's WTCB's could be examined per revolution. Therefore, recovery time would be dependent on the number of cylinders and the operating RPM.

Once the latest WTCB is found, the list of outstanding WTCB's will be used to write the data contained in the list of outstanding WTCB's to the correct destinations, putting the drive into a consistent state.

Figure 3:
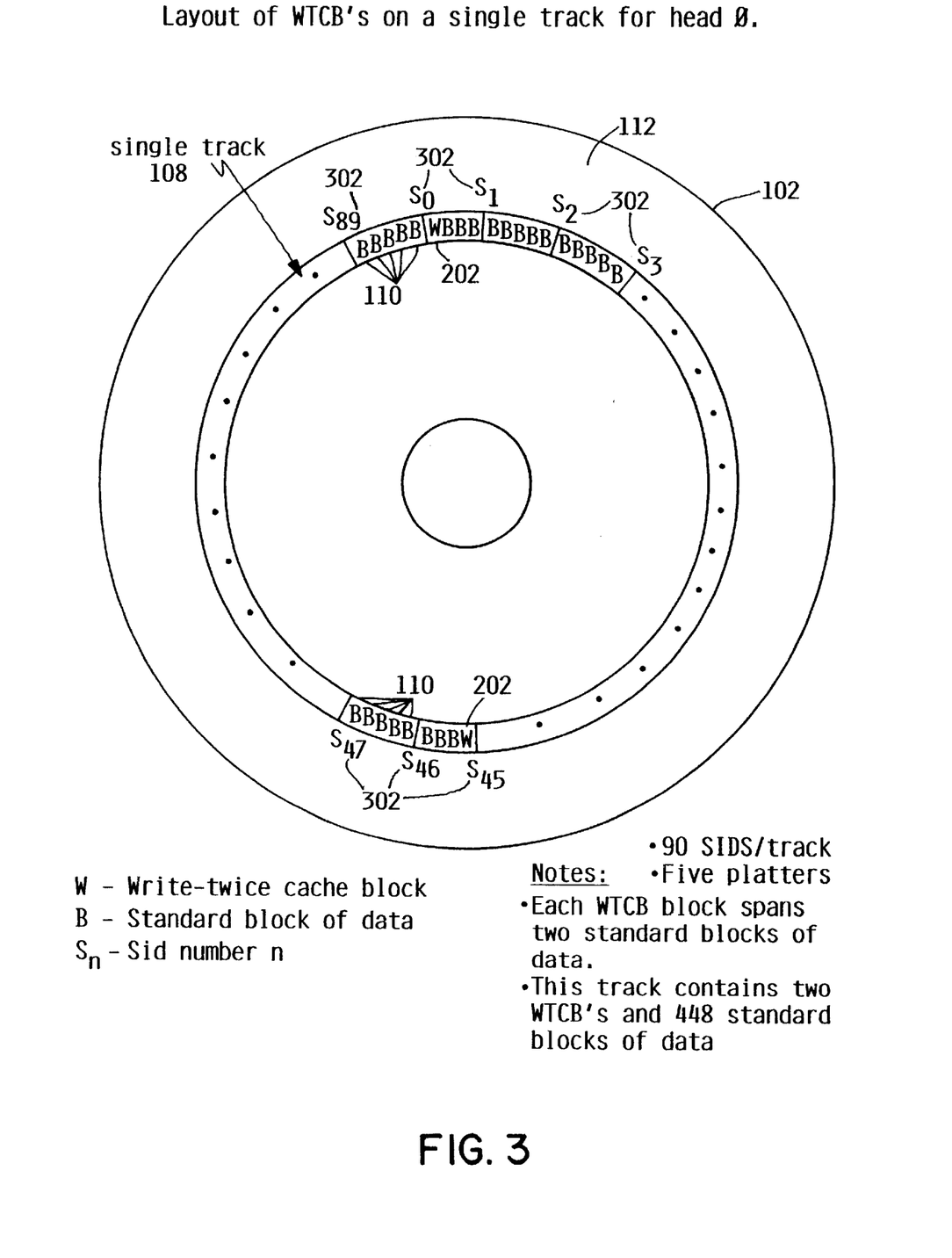
FIG. 3 illustrates an exemplary layout of write-twice cache blocks (WTCB's) on a single track for head 0 of a disk drive, according to an exemplary embodiment of the invention.

FIG. 3 illustrates an exemplary layout of write-twice cache blocks (WTCB's) 202 on a single track 108 for head 0 of a disk drive platter 102 surface 112, according to an exemplary embodiment of the invention, in more detail. The drive could have 5 similarly arranged platters 102. The WTCB's are labeled "W" and numbered 202, while standard blocks of data are labeled "B" and numbered 110. SID numbers are labeled "Sn" and given reference number 302.

In a disk drive according to the illustrated example, there may be 90 SID's 302 per track 108. Each WTCB "W" (202) spans two standard blocks "B" (110) of data. The illustrated track 108 has 2 WTCB's "W" (202) and 448 standard blocks "B" (110) of data.

Figure 4:
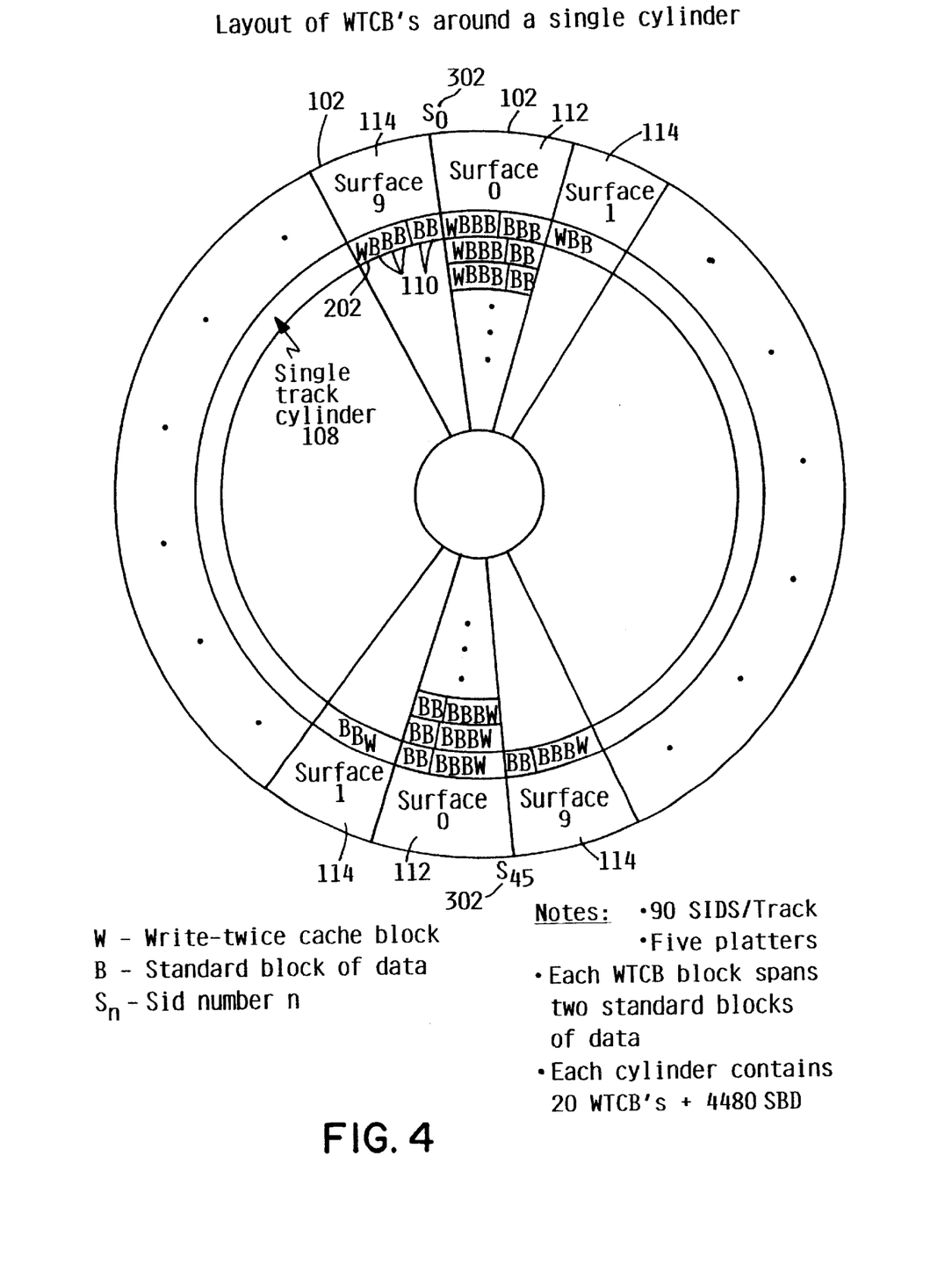
FIG. 4 illustrates an exemplary layout of WTCB's around a single cylinder of a disk drive, according to an exemplary embodiment of the invention.

FIG. 4 illustrates an exemplary layout of WTCB's "W" (202) around a single cylinder 108 of a disk drive having 5 platters 102 with 10 surfaces 112, 114, according to an exemplary embodiment of the invention. Only three of the surfaces 112, 114 are shown, in particular, surfaces 0, 1 and 9, for simplicity. The other surfaces, 2–8, would be configured in a similar manner.

It should be noted that, having the WTCB's spaced around an entire track is not a requirement. Instead, multiple cylinders could be used, requiring that short seeks (one or two cylinders) be performed to write some WTCB's. This would reduce the time required for recovery at the expense of reducing the average number of WTCB's that could written. This is a design point that would be worked out based on the performance and recovery requirements. In other words, if we assume, for example, that there are 3 WTCB's per track, then the entire track will have to be read in the case of a failure. This takes one revolution of time. If however, each track contains only 1, WTCB, then on average, 3 tracks worth of WTCB's could be read per revolution. After the first WTCB on a track is read, the actuator will switch to the next track before the next WTCB arrives under the head. If fewer WTCB's are used, then the average time required to reach an empty WTCB increases. This occurs in one of two ways; either the process continues to write to tracks on the same cylinder, which are now spaced further apart, or it must do a 1-cylinder seek, which may take longer than doing the simple track switch in the prior case.

As shown in the illustrated example of FIG. 3, each of the five platters 102 has tracks 108 having 90 SID's per track, and each WTCB "W" (202) spans two standard blocks of data "B" (110). Therefore, each cylinder (a collection of the 10 tracks 108 on the five platters 102) contains 20 WTCB's "W" (202) and 4480 standard blocks of data "B" (110).

In this example, a scheme for placing/locating WTCB's 202 is implemented through a simple calculation based on the head number.

Let the number of WTCB's per track=2; the number of SID's per track=120; and the number of heads=10 (one head per surface of the 5 platter drive).

Since a cylinder's 20 WTCB's (number of heads 10 times the number of WTCB's per track 2) are equally spaced apart, the distance between each WTCB is 6 SID'S:

120 SID's/(2 WTCB's per head*10 heads)

120 SID's/20 WTCB's=6 SID's

Therefore, taking all 10 of the first WTCB's of the 10 tracks in the cylinder will occupy 60 SID's or ½ of a revolution. The 10 second WTCB's are then laid out in the remaining 60 SID's or ½ revolution.

Thus, in this case, each WTCB of a pair of WTCB's on a track will be directly opposite each other (60 SID's apart).

FIG. 4 shows an example of a 90 SID track layout. In this case, each WTCB of a pair of WTCB's on a track will be 45 SID's apart and the distance between each WTCB is 4.5 SID's:

90 SID's/20WTCB's=4.5 SID's

In the 120 SID/track example, the formula for deciding which SID each WTCB is located at is as follows:

First WTCB: 6*head number

Second WTCB: 6*head number+60

Therefore, all of the tracks on a given surface (one side of a platter) will have their WTCB's located at the same SID's. Given this, these would be precalculated for head and stored as constants which could be rapidly accessed.

Further, having the WTCB's located in the same place rotationally has an additional side benefit. In particular, the time required to do a control switch is essentially equal to the time to do a one cylinder seek. The reason for this relates to the fact that the head/comb structure and a given cylinder are not perfectly aligned. Due to mechanical inaccuracies, only the current track being used is centered on that surface's head. The electronic switch to another head is almost instantaneous, the rest of the control switch time is spent getting the current head centered on track. In fact, the difference between the top and bottom head may be three or more whole cylinders, for example.

Given that the WTCB's are located in the same rotational positions on a surface means that when the electronic switch to another head occurs, the drive can center the head on whatever track it is closest to assuming that that WTCB is not already in use, which is extremely inlikely). This reduces the control switch time, allowing for an increase in the number of WTCB's and the rate at which they can be written.

It should be noted that seek time is directly related to the seek length, which is measured in cylinders (or tracks) as the difference between the prior and current command's cylinder (or track) position. A representative table of seek lengths and corresponding seek times is presented below:

TABLE 1

Seek Length vs. Seek Time

| Seek Length (cylinders) | Seek Time (ms) |
|---|---|
| 1 | 0.3 |
| 2 | 0.8 |
| 4 | 0.95 |
| 8 | 1.07 |
| 16 | 1.19 |
| 32 | 1.33 |
| 64 | 1.60 |
| 128 | 1.93 |
| 256 | 2.33 |

TABLE 1-continued

Seek Length vs. Seek Time

| Seek Length (cylinders) | Seek Time (ms) |
|---|---|
| 512 | 2.85 |
| 1024 | 3.34 |
| 2048 | 4.03 |
| 4096 | 5.27 |
| 8192 | 8.03 |

To translate the above Table 1 values into SID (server ID) times, assuming 90 SID's per revolution, for example, one would take the time/6.0*90, which is the portion of a revolution time (time/6.0 ms) times the number of SID'S per revolution (e.g., 90).

The maximum latency, wait for selected block to come under the head, is equal to 1 revolution. In the above example, one revolution equals 6.0 ms or 90 SID's, therefore, this is the maximum latency for that case.

The time to do a control switch from one head to another is, for example, approximately the time to do a 1 cylinder seek, e.g., 0.3 ms.

The minimum time between the end of a WTCB and the start of a next one on a cylinder basis is dependent on the number of WTCB's per cylinder, the time to write one block of data, and the control switch time.

For example, considering 3 WTCB's per track and 10 tracks per cylinder there would be 30 WTCB's per cylinder. Assuming an even spacing, the time between WTCB's would be the time for one revolution divided by the number of WTCB's per cylinder minus the time to write one block of data. Using previously presented values, and assuming the time to write one block of data is 0.015 ms, then:

(6.0 ms/30)-0.015 ms=0.185 ms.

However, on a cylinder basis, the minimum time between the end of a WTCB and the start of the next one should be greater than the time to do a control switch from one head to another, e.g., greater than 0.3 ms.

With respect to the above example, assuming the control switch time is 0.3 ms, the calculated time between WTCB's of 0.185 ms is not optimal. In the above example, the number of WTCB's would need to be reduced to one per track, for example, with the time between WTCB's being:

6.0 ms/10-0.015 ms=0.585 ms

This time is an acceptable value meeting the criteria that the minimum time between the end of a WTCB and the start of the next one should be greater than the time to do a control switch from one head to another. Of course, the time to switch back to the original track is same as the original control switch, e.g., in the above example, 0.3 ms.

With 2 WTCB's per track, the criteria is not met:

6.0 ms/20-0.015 ms=0.285 ms

It should be noted that the number of WTCB's per track is dependent on the control switch time. In the example given, the time was 0.3 ms, however 0.1 ms is another representative control switch time. Further, it is not necessary to write successive WTCB's. Instead, every other WTCB could be written, which would increase the probability that a WTCb would be empty later.

The invention takes advantage of the latency to write data from cache memory to special blocks on the disk surface referred to as write twice cache blocks (WTCB's). Because the cached data is written to the disk surface, should there be a power failure, for example, the data will not be lost. Thus, this is referred to herein as fail-safe write caching.

Actually, two properties of hard drives are taken advantage of for fail-safe write caching: hard drives are a non-volatile storage medium; and the main performance bottleneck of hard drives is drive latency. Once a block from the write cache memory has been written to a WTCB, that data can be removed from the write cache memory, and thereafter, the WTCB acts as the write cache for that data. Later, the data is read from the WTCB and written to the final destination. The net effect of the WTCB acting as a write cache is that more write commands can be cached than could otherwise be stored in the volatile write cache memory. Thus, the effect is the advantageous creation of a virtual cache.

Advantageously, fail-safe write caching is provided without the need for any additional hardware by utilizing these specially arranged portions of the disks (WTCB's) to write the cached data during DASD idle time before finally writing the data to its intended ultimate disk location. A DASD operated according to this aspect of the invention has a competitive advantage over DASD's which do not provide a fail-safe write cache and incur the risk of losing cached data, those which provide fail-safe write caching through the use of additional hardware and thereby incur greater manufacturing cost, or those which do not implement any write caching at all and incur a lower performance level.

Special error checking to avoid WTCB errors may be implemented. As with nearly any new functionality, special 'sanity' checks may be required to insure that the feature is performing correctly. These would include checks on the time stamp, as well as new error codes and recovery procedures in case of any detected errors in the WTCB's.

It is also noted that in the above described procedure, the WTCB's are written to the disk surface during a read or write operation latency, a write confirmation is sent to the initiator, and then some time later, the data is read from the WTCB's and written to its ultimate destination. However, it could happen that a read operation is given to read from a location which has not yet been written with updated data, i.e., data which is still stored in one or more WTCB's. In other words, the application has received a confirmation of a write to disk, but the write was only to the WTCB and not to the ultimate destination yet. Therefore, if a subsequent read comes along before the writing to the ultimate destination, it might read old data.

One skilled in the art would know that, in the past, with ordinary cache memory, to avoid any such problem, whenever a read command is received, the drive may perform a 'cache scan' to see if the data is already contained in the cache memory before looking to the disk surface. If it is in the cache memory, then this is referred to as a 'cache hit'. When this 'hit' occurs, the data is read from the cache memory and returned to the initiator. This speeds data access by skipping the mechanical access to the data.

Similarly, a scan of WTCB cache would be performed, e.g., by reading the list of write data not yet written to its ultimate destination for a 'hit.' In the case of a 'WTCB hit', the data will be returned from WTCB just like any other type of data residing in the cache and no other special handling should be required. If the data (WTCB) was flushed from the cache, the WTCB would need to be read off the disk.

Figure 5:
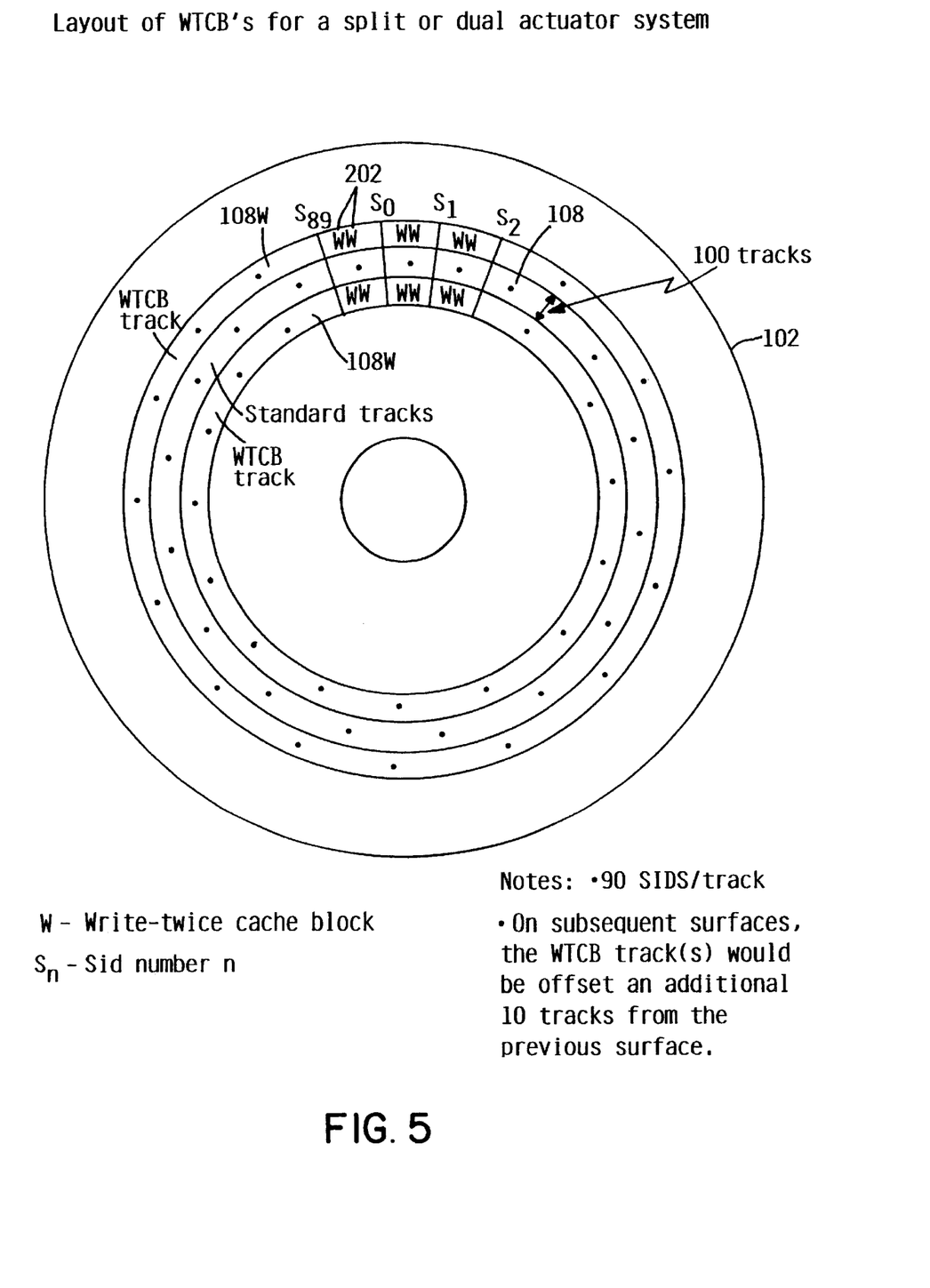
FIG. 5 illustrates an exemplary layout of WTCB's for a split of dual actuator disk drive system, according to an exemplary embodiment of the invention.

Regarding the comb head structure, currently the heads are not able to move (seek) independently of the other heads. However, a 'split actuator' configuration has been proposed. This is a configuration which divides the heads into two independent actuators. The basic idea behind this configuration is that while one actuator is reading or writing, the other is seeking to a new location. The present invention could be applied to take advantage of this split actuator configuration. FIG. 5 illustrates an exemplary layout of WTCB's for a split of dual actuator disk drive system, according to an exemplary embodiment of the invention.

Instead of sprinkling the WTCB's on each track 108, one out of every x tracks 108W would be a WTCB track dedicated to WTCB's (see FIG. 5). Then. if a number of accesses (reads or writes) are occurring on one actuator, the other actuator can be writing WTCB's on one of these WTCB tracks 108W. With this design, multiple WTCB's could be written whenever the other actuator was seeking. Further, with this configuration, both of the performance penalties outlined earlier could be eliminated.

A typical electronic disk cache memory could contain up to 1.5 megabytes of data. This value is constrained by the number of blocks in each command. Typically, a cache memory is divided into a number of 'segments', each of which can hold one command's worth of data. Typically, there would be a maximum of 16 segments. This allows caching up to 15 write commands, one being left open for the next command.

According to an exemplary embodiment of the invention, there could be 3 WTCB's per track. Assuming a 5-platter, 10-head, 10,000-track DASD (disk drive), this would be 60,000 WTCB's per platter or 300,000 WTCB's per DASD.

It should be noted that when placing WTCB's on each track/cylinder, the WTCB's could be mapped out as 'defects' on the disk. As is known in the art, virtually every hard drive has a number of these defects, which are 'mapped out' during formatting or disk diagnostics, for example. Having WTCB's would increase the rate that these defects are seen, but it would have minimal performance impact as mentioned earlier.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. In a system having at least one direct access storage device with at least one surface formatted in a plurality of concentric tracks, there being a respective transducer for each formatted surface, and wherein the direct access storage device has an associated electronic write cache memory, a method comprising:

providing cache blocks on the at least one surface;

storing data from an initiator to be written to the direct access storage device in the associated electronic write cache memory;

whenever a direct access storage device seek operation is in progress, completing the seek operation and, during any latency time, writing at least some of the data stored in the electronic write cache memory to the cache blocks until all the data stored in the electronic write cache memory is written to the cache blocks; and after all the data stored in the electronic write cache memory is written to the cache blocks, notifying the initiator that the data has been written to the direct access storage device.

2. The method according to claim 1, further comprising:

storing a list of data written to the cache blocks which has not been written to a respective ultimate direct access storage device destination;

reading data written to the cache blocks and writing the data read from the cache blocks to the respective ultimate destination on the direct access storage device; and updating the list to reflect that the data was written to the ultimate destination.

3. The method according to claim 2, further comprising:

accessing data from the direct access storage device by initially scanning the cache blocks by reading the list of data written to the cache blocks which has not yet been written to a respective ultimate direct access storage device destination to detect a hit;

if a hit is detected during the scan, then returning the write data associated with the hit from the cache blocks;

otherwise, reading the data from the ultimate destination.

4. The method according to claim 1, wherein the providing cache blocks on the at least one surface comprises:

providing cache blocks spaced evenly apart in the concentric tracks on the at least one surface.

5. The method according to claim 1, wherein there are a plurality of surfaces with concentric tracks, corresponding tracks on the respective surfaces being a respective cylinder, and wherein the providing cache blocks on the at least one surface comprises:

providing cache blocks spaced evenly apart in the concentric tracks of each respective cylinder.

6. A method of fail-safe write caching for a disk drive having at least one disk, comprising:

storing in write cache memory, write data intended for a disk location;

writing at least a part of the data stored in the cache memory to specially arranged portions of the at least one disk during drive idle time; and subsequently, reading the data from the specially arranged portions of the at least one disk and writing the read data to the intended disk location.

7. The method according to claim 6, wherein the drive idle time comprises the time between when a head has arrived over a correct cylinder and when a correct location on a track is reached.

8. The method according to claim 3, wherein the at least one disk comprises a plurality of disks having concentric tracks, a respective set of corresponding tracks on the disks being a cylinder, and wherein the specially arranged portions are located on each respective cylinder such that they are spaced evenly apart.

9. The method according to claim 6, wherein a first specially arranged portion is placed on a topmost disk track in a respective cylinder, and then each successive specially arranged portion is located on a next lower disk track in the respective cylinder, until a lowermost disk track of the cylinder is reached, whereupon the next specially arranged portion is placed on the topmost disk track of a next respective cylinder, and so on.

10. The method according to claim 6, wherein, the at least one disk comprises a plurality of disks having concentric tracks, a respective set of corresponding tracks on the disks being a cylinder, and wherein the specially arranged portions are located in multiple cylinders, wherein short seeks of less than three cylinders are performed to write some specially arranged portions.

11. The method according to claim 3, further comprising:

after a block from the write cache memory has been written to a specially arranged portion of the at least one disk, removing that data from the write cache memory, and thereafter, the specially arranged portion of the at least one disk acts as the write cache for that data;

whereby the net effect of the specially arranged portion of the at least one disk acting as a write cache is that more write commands can be cached than could otherwise be stored in the write cache memory, thus creating a virtual cache.

12. A method of fail-safe write caching for a disk drive having at least one disk, comprising:

storing in write cache memory, write data intended for a disk location;

writing at least a part of the data stored in the cache memory to specially arranged portions of the at least one disk during drive idle time; and subsequently, reading the data from the specially arranged portions of the at least one disk and writing the read data to the intended disk location;

wherein the specially arranged portions each comprise:
one block of data from the write cache,
a data disk destination address,
a time stamp which uniquely identifies the block of data as the latest entry, and
a list of which specially arranged portions contain write cache information which has not yet been written to the respective intended disk location.

13. The method according to claim 5, wherein, when data for a write command is written to the respective intended disk location, the associated specially arranged portion is removed from the list of which specially arranged portions contain write cache information which has not yet been written to the respective intended disk location.

14. The method according to claim 5, further comprising:
performing error checking of the time stamp.

15. In a system having at least one direct access storage device with at least one surface formatted in a plurality of concentric tracks, there being a respective transducer for each formatted-surface, and wherein the direct access storage device has an associated electronic write cache memory, a method comprising:

providing cache blocks on the at least one surface;

storing data from an initiator to be written to the direct access storage device in the associated electronic write cache memory;

whenever a direct access storage device seek operation is in progress, completing the seek operation and, during any latency time, writing at least some of the data stored in the electronic write cache memory to the cache blocks until all the data stored in the electronic write cache memory is written to the cache blocks; and after all the data stored in the electronic write cache memory is written to the cache blocks, notifying the initiator that the data has been written to the direct access storage device;

wherein there are a plurality of surfaces with concentric tracks, corresponding tracks on the respective surfaces being a respective cylinder, and wherein the providing cache blocks on the at least one surface comprises:

providing cache blocks spaced evenly apart in the concentric tracks of each respective cylinder; and wherein the cache blocks are spaced apart so that, on a cylinder basis, a minimum time between the end of a first cache block on a first respective surface relative to the transducer associated with the first respective surface, and the start of a next cache block on a next respective surface relative to the transducer associated with the next respective surface, is greater than a time to do a control switch between the respective transducers.

16. The method according to claim 15, wherein the number of cache blocks per track is proportional to the time to do a control switch between respective transducers.

17. In a system having at least one direct access storage device with at least one surface formatted in a plurality of concentric tracks, there being a respective transducer for each formatted surface, and wherein the direct access storage device has an associated electronic write cache memory, a method comprising:

providing cache blocks on the at least one surface;

storing data from an initiator to be written to the direct access storage device in the associated electronic write cache memory;

whenever a direct access storage device seek operation is in progress, completing the seek operation and, during any latency time, writing at least some of the data stored in the electronic write cache memory to the cache blocks until all the data stored in the electronic write cache memory is written to the cache blocks; and after all the data stored in the electronic write cache memory is written to the cache blocks, notifying the initiator that the data has been written to the direct access storage device;

wherein the at least one direct access storage device has a plurality of surfaces and transducers, and has a split actuator configuration which disposes the respective transducers into at least two independent actuators so that, while a transducer on one actuator is reading or writing, a transducer on the other actuator is performing a seek; and wherein, on each surface, one out of every N tracks is a track dedicated to cache blocks;

whereby, if a number of read or write accesses are occurring on one of the two actuators, the other actuator can be writing cache blocks on one of the dedicated, so that multiple cache blocks can be written whenever an actuator is seeking.

18. In a system having at least one direct access storage device with at least one surface formatted in a plurality of concentric tracks, there being a respective transducer for each formatted surface, and wherein the direct access storage device has an associated electronic write cache memory for receiving write data from an initiator, an apparatus for fail-safe write caching comprising:

means for providing cache blocks on the at least one surface of the direct access storage device;

means for storing data received from an initiator, in the associated electronic write cache memory;

means for writing portions of the data stored in the electronic write cache memory to the cache blocks on the at least one surface of the direct access storage device, until all the data stored in the electronic write cache memory is written to the cache blocks, the writing being done during any latency time after completing a seek operation in progress; and, means for notifying the initiator that the data has been written to the direct access storage device after all the data stored in the electronic write cache memory has been written to the cache blocks on the at least one surface of the direct access storage device.

* * * * *